Oct. 21, 1924.

C. S. BARRELL 1,512,518

TRACTION DEVICE FOR TIRES

Filed May 11, 1920 2 Sheets-Sheet 1

Inventor:
Charles S. Barrell,
by Robt. P. Haws.
Attorney

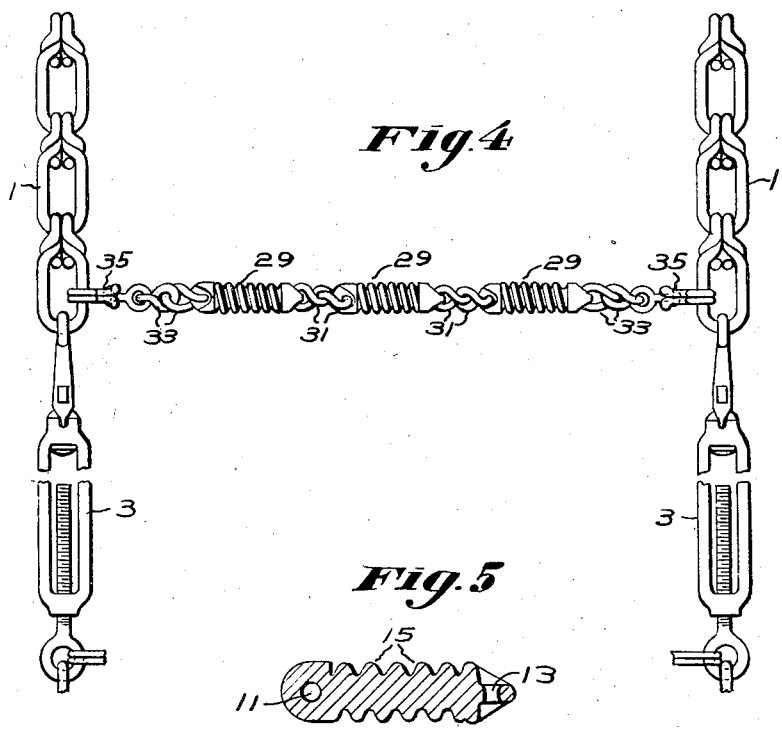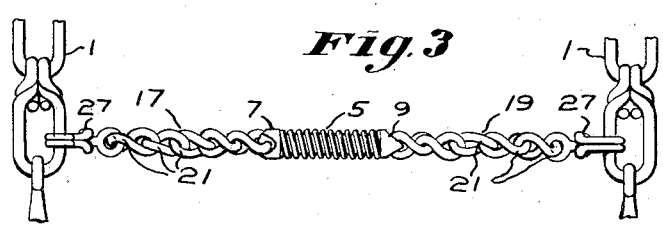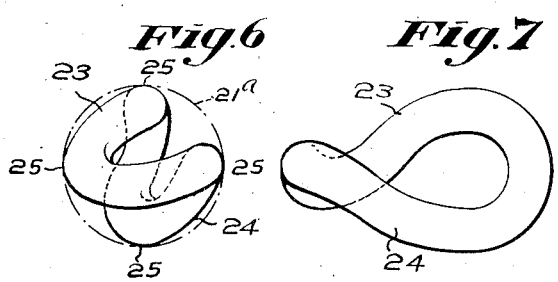

Patented Oct. 21, 1924.

1,512,518

UNITED STATES PATENT OFFICE.

CHARLES S. BARRELL, OF BOSTON, MASSACHUSETTS.

TRACTION DEVICE FOR TIRES.

Application filed May 11, 1920. Serial No. 380,694.

*To all whom it may concern:*

Be it known that I, CHARLES S. BARRELL, a citizen of the United States, residing at Boston, in the county of Suffolk and State of Massachusetts, have invented an Improvement in Traction Devices for Tires, of which the following description, in connection with the accompanying drawings, is a specification, like characters on the drawings representing like parts.

The invention to be hereinafter described relates to traction devices for tires.

A usual form of traction device or tire chain comprises circular or circumferential side members or chains adapted for location at opposite sides of a wheel or tire, and a series of tread members connected to said side members or chains at intervals and extending transversely across the tread of the tire. These transverse tread members experience hard usage and are subjected to wear requiring the frequent substitution of new tread members therefor.

One of the purposes of the present invention is to provide a traction device for wheels provided with strong and durable transverse tread members which will be longer lived and more efficient than those now in use.

The traction effect on the transverse tread members tends to rotate or twist the same, and where the tread member is in the form of a chain, the tendency is to cause the same to twist or kink so as to shorten the effective length thereof. This will tend to produce projections which are liable to bite into and injure the tread of the tire, and also tend to so twist the links as to rupture the same.

Another purpose of the invention, therefore, is to provide an improved transverse tread member which may be rotatively connected to the side holding members so that the transverse tread member may roll on its longitudinal axis, and may roll or creep along the tread of the tire so as not only to distribute the wear on the tire circumferentially thereof, but also distribute the wear on the tread member circumferentially thereof. In carrying this feature of the invention into practical effect, one or more rigid elongated tread elements may be employed having an efficient tread surface and a rounded character which will facilitate the rolling of the tread member and tend to prevent kinking or other distortion thereof such as would be likely to injure the tire or the tread member.

With the aforesaid and other purposes in view, the character of the invention may be best understood by reference to the following description of one good form thereof, shown in the accompanying drawing, wherein:

Fig. 1 is a side elevation of a wheel equipped with a traction device embodying the invention;

Fig. 2 on an enlarged scale is a radial transverse section through the tire shown in Fig. 1;

Fig. 2ª on an enlarged scale is a detail of the rounded links;

Fig. 3 on an enlarged scale is a view of a portion of the traction device shown in Fig. 1;

Fig. 4 on an enlarged scale is a view of a portion of a slightly modified form of traction device embodying the invention;

Fig. 5 is a longitudinal section of one of the tread elements; and

Figs. 6 and 7 are respectively end and side views of one of the links.

Figure 1:
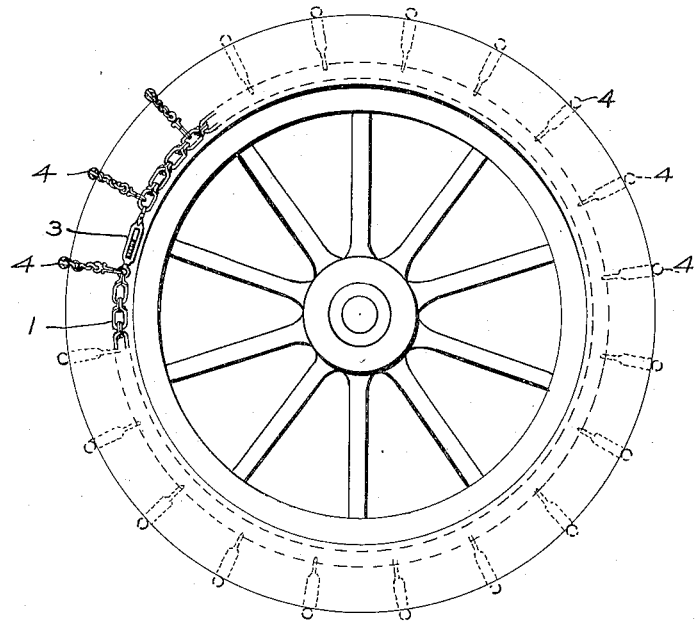

Referring to the drawing, the traction device shown therein as one good form of the invention, comprises circular or circumferential side holding members, in the present instance of the invention, in the form of side chains 1 having their terminals adjustably connected by swivel-turn-buckles 3.

Connected to the side holding members or chains are a series of tread or cross members 4 extending transversely across the tread of the tire, and in the present instance of the invention, each of these tread members comprises a central tread element conveniently in the form of a rigid elongated body 5 having terminals 7 and 9 provided with eyes 11 and 13 preferably having their axes extending transversely to each other. The portion of the body intermediate the terminals 7 and 9 may be provided with any suitable surface for efficient traction effect. In the present instance of the invention, this surface is provided by a series of deep ribs or corrugations 15 extending circumferentially of the body and conveniently of helical or spiral character. The body 5 may be formed of solid or tubular stock, but if the latter form is adopted, preferably the terminals are closed so as to prevent entrance of dirt therein.

The ribs or corrugations are important, since they constitute efficient means for gripping the tire and ground and resist side skidding of the tire on the ground, whereas, if the body had a smooth surface it would act as a skid or runner which would promote side skidding.

Since the body 5 may be made of solid or tubular stock, it may have a smaller diameter than the usual cross chains without sacrifice of strength.

Figure 2:
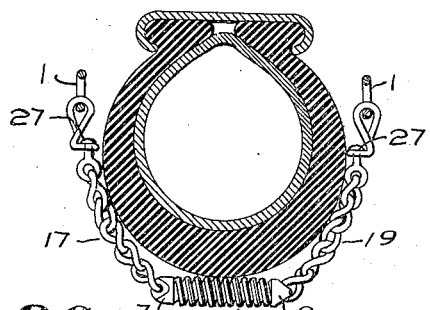
Figure 2A:
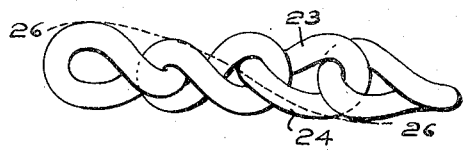

Suitable elements may be provided to connect the terminals of the body 5 with the circumferential side holding members or chains. To accomplish this, in the present instance, short chains 17 and 19 are provided, each comprising a series of links 21 which are preferably formed with an external contour such that they may readily roll along the surface of the tire. To accomplish this, in the present instance, each of the links may have crossing side members 23 and 24, but instead of contacting or nearly contacting at their crossing point, said sides are spread or opened out so that four points 25 thereof may lie substantially on a cylindrical surface 21ª (Fig. 6) and instead of tending to lie flat against the tire, the link will tend to roll along the tire when acting as a traction element. The series of links may desirably be progressively twisted so that collectively they will have their outermost points, that is, four points on each link progressively disposed from end to end of the chain, so that said points will lie on helical lines, such, for example, as the broken line 26—26 (Fig. 2ª) substantially as in the cross chain of my Patent No. 1,374,347, dated April 12, 1921.

The inner ends of the chains 17 and 19 may be connected to the eyes 11 and 13 of the body 5, and the outer ends of said chains may be connected to the side holding members or chains. In the present instance of the invention, the outer ends of said chains 17 and 19 are connected to the side holding members or chains by wire double hook swivels 27, the construction being such that the tread member as a whole can readily rotate on its axis and distribute the wear on the parts thereof, and may readily creep circumferentially of the tread of the tire, so as to distribute the wear thereon.

The terminals 7 and 9 of the body 5 may be formed to protect the portions of the links entered through the eyes 11 and 13 thereof. In the present instance, the terminals present substantially circular portions adjacent the eyes and strong shoulders projecting from said circular portions and laterally outward beyond the tongues in which the eyes are placed. The construction is such that the traction effect will come on the terminal shoulders to a large extent and thereby substantially protect the portions of the links adjacent thereto, and reinforce the weakest parts of the body.

Referring now to the modification shown in Fig. 4, the construction thereof may be similar to the construction already described, with the exception that a plurality of rigid bodies 5 is employed in each of the transverse tread members. In the present instance, three such bodies 29 are shown, the intermediate body being connected to the adjacent bodies by one or more links 31, in the present instance, two being shown. These links may be of the same character as the links 21 described, so that they may readily roll along the tread surface of the tire. The axes of the eyes of the terminals of each of the bodies 29 may extend transversely to each other, so that the connecting links for the bodies will be disposed in a relation such as further to prevent the links from lying flat against the tire. The outermost members 29 may be connected by one or more links 33 with swivels 35 connected in turn to the side holding members or chains, in the present instance, two such links being shown, and these links may be of the same character as the links 21 described to enable the same readily to rotate along the tire. The cylindrical bodies 29 constitute strong, durable tread elements which will more effectively withstand wear and hard usage than a tread member composed solely of links, and said bodies will more readily rotate so as to distribute the wear thereon and the wear on the tire than on the links. Also, they do not present so many parts or surfaces adapted to rub against each other with grinding and weakening action as in the case of a tread member composed of links.

The central portion of the transverse tread member experiences the greatest amount of wear, and in some instances the modification shown in Fig. 3 and first described, will efficiently serve the purposes, since the rigid body 5 thereof lies on the portion of the tread of the tire which experiences the greatest traction effect and hardest usage, and this is specially true in the case of tires of smaller sizes. The modification shown in Fig. 4 may be applied to tires of larger sizes where the tread surface of the tire had greater width, and in this case the plurality of rigid bodies 5 will serve to cover the portion of the tread surface which experiences the greatest traction effect and hardest usage.

It will be understood that the invention is not limited to the specific embodiment shown, and that various deviations may be made therefrom without departing from the spirit and scope of the appended claims.

What is claimed is:—

1. A traction device for tires comprising a tread member of substantial length having a general rounded character adapting it in action to roll on the tire tread and distribute the wear thereon, said member having a tread surface formed to resist skidding, the terminals of the tread member being provided with eyes therein and tread shoulders formed for protecting the eyes, and holding means for said tread member including swivel devices permitting the tread member to roll on the tire tread.

2. A traction device for tires comprising a metallic tread member of substantial length and of such cross section as to adapt it in action for rotative adjustment on the tire tread, said member having eyes formed therein at opposite ends thereof, and said member being formed with protecting portions extending outward beyond said eyes, and members connected to said eyes and adapted for connection with holding devices at the sides of the tire and having provision permitting the rotative adjustment of the tread member.

3. A traction device for tires comprising a tread member of substantial length having a general rounded character adapting it in action to roll on the tire tread to distribute the wear thereon, said tread member having a tread surface formed to resist skidding, flexible members connected to the ends of said member and adapted for connection with holding devices at sides of the tire, each of said flexible members comprising links collectively so formed that corresponding portions of successive links occupy progressive angular positions giving the links an outer contour for rolling engagement with the tread of the tire, and swivel devices connected to the flexible members and adapted for connection with holding devices at the sides of the tire.

4. A traction device for tires comprising a substantially cylindrical, rigid tread member adapted in action to roll on the tire tread to distribute the wear thereon, and flexible members connected to opposite ends of the rigid tread member and each comprising a series of links collectively forming a spiral twist extending lengthwise of the series of links, that the latter may have rolling engagement with the tread of the tire.

5. A traction device for tires comprising a rigid, elongated tread member having a cross section adapting it in action for rotative adjustment on the tire tread to distribute the wear thereon, said member having spiral ribs to resist skidding, and members connected to said tread member and adapted for connection with holding devices at the sides of the tire.

6. A traction device adapted to extend transversely on a tire comprising, rigid, inflexible, elongated tread members of such cross section as to adapt them in action for automatic rotative adjustment on the tire tread, said members having surfaces formed to resist skidding, and swivel devices for connection with holding devices at sides of the tire, thereby to permit the rotative adjustment of the tread members.

7. A traction device for tires comprising rigid, substantially cylindrical tread members adapted to extend transversely of the tire tread, each of said members having eyes at opposite ends thereof and terminal shoulders integral with the member and formed to protect said eyes, and swivel devices adapted for connection with holding means at the sides of the tire and permit rotative adjustment of said members to distribute the wear thereon.

8. A traction device for tires comprising circular side chains adapted for location at opposite sides of a tire, and a series of cross members connected to the side chains at intervals and adapted to extend transversely of the tire tread, each of said cross members including a rigid, inflexible, elongated tread member of such cross section as to adapt it in action for automatic rotative adjustment on the tire tread, and elements permitting the rotative adjustment of the cross members relatively to the circular side chains.

9. A traction device for tires comprising circular side chains adapted for location at opposite sides of a tire, and a series of cross members connected to the side chains at intervals and adapted to extend transversely of the tire tread, each of said cross members including a rigid, inflexible tread member having substantial length and a generally rounded character adapting it in action for automatic rotative adjustment on the tire tread, swivel devices connected to the circular side chains, and chains connected to the tread member and the swivel devices.

10. A traction device for tires comprising side chains adapted for location at opposite sides of a tire, and a series of cross members connected to the side chains at intervals and adapted to extend transversely of the tire tread, each of said cross members including a rigid, inflexible, elongated tread member having circumferential ribs to resist skidding.

11. A traction device for tires comprising a tread member of substantial length having a general rounded character adapting it in action to roll on the tire tread to distribute wear thereon, said member having eyes formed therein at opposite ends thereof, substantial circular portions adjacent said eyes, and protecting portions projecting from said circular portions laterally outward beyond said eyes for protecting the latter; and members connected to said eyes and adapted for connection with holding devices at the sides of the tire.

12. A traction device for tires comprising a tread member of substantial length having a general rounded character adapting it in action to roll on the tire tread to distribute wear thereon, said member having eyes formed therein at opposite ends thereof, the axes of said eyes being transverse to each other, said tread member having portions formed to protect said eyes; and members connected to said eyes and adapted for connection with holding devices at the sides of the tire.

In testimony whereof, I have signed my name to this specification.

CHARLES S. BARRELL.